Aug. 22, 1944.        R. HELL        2,356,584
RECORDING SPINDLE
Filed Nov. 23, 1940

Inventor
RUDOLPH HELL
By
Attorney.

Patented Aug. 22, 1944

2,356,584

UNITED STATES PATENT OFFICE 2,356,584

RECORDING SPINDLE

Rudolf Hell, Berlin-Dahlem, Germany; vested in the Alien Property Custodian

Application November 23, 1940, Serial No. 366,933
In Germany August 7, 1939

2 Claims. (Cl. 234—70)

The present invention relates to recording spindles known as Meyer spirals which serve for the facsimile transmission of characters, Morse signals or other signals.

To completely record at least a character on the receiving tape in the case of differences in synchronism between the signal transmitter and the spindle, the spindle is so designed that each image point of a character is scanned two times simultaneously and recorded. In this case the distance between two image points simultaneously recorded is equal to the length of a scanning line for a character. The lines or characters simultaneously recorded are therefore separated from one another a very small distance, such as shown for example in patent to Kleinschmidt et al., No. 2,131,741, October 4, 1938. Such lines may be varied to a slight extent only by subdividing the field of image. The lines recorded are arranged close to one another.

According to the invention the distance between two points recorded simultaneously is made in contradistinction to the known arrangements of this character greater than the length of a scanning line for a character. In this manner the individual records may be more easily separated and may be again utilized separately. This is not only advantageous in the case of a multiple record of a character but also in the case of the simultaneously recording of different characters by a spindle and separate magnet systems. The latter may then be easily arranged close to one another.

However, if the distance between two spindle points which scan simultaneously is made two or several times greater than the length of a scanning line of a character, a spindle may be employed with one or more threads which scan simultaneously and which are in part ground out in rings. That is to say, one or more threads may be formed on a relatively long spindle or drum and an intermediate portion or portions of the thread or threads ground off, leaving each thread interrupted by a ring shaped reduced portion. The spindle serving to simultaneously record any number of characters may then be made of one piece, all threads being ground throughout their length and the rings ground out subsequently. Any particular adjustment of the spindle threads to the same phase and a subsequent over-grinding which is necessary when employing a plurality of separate spindles owing to the great accuracy required in maintaining the diameter of the spindle (±0.002 mm.) are avoided by forming the spindles in one piece as above described.

Further details of the invention will be explained by reference to the accompanying drawing, wherein Fig. 1 is a diagrammatic top elevation showing two printing wheels formed in one piece and part of a printing tape, each wheel having one turn of thread;

Figure 1:
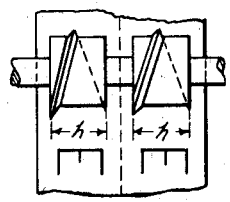

In Fig. 1 is shown an embodiment in which two spindle portions are employed having each a thread which record simultaneously. The spindles are so arranged in spaced relation on an axis that the lines are recorded in the center of both halves of the tape separated by perforations. Instead of a receiving tape with perforations, a particular receiving tape may be allotted also to each line and all tapes may be driven by a common transport roller, irrespective of whether the arrangement serves for the simultaneous record of one or several characters. At all events the width of the paper tape can be chosen in such a manner that in the case of perforated tapes the lines recorded lie in the center of the tapes or tape widths allotted thereto.

Figure 2:
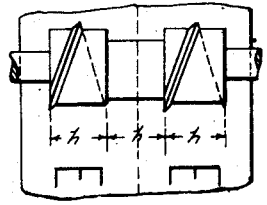
Fig. 2 is a view similar to Fig. 1 but showing wider spacing of the printing wheels.
Figure 3:
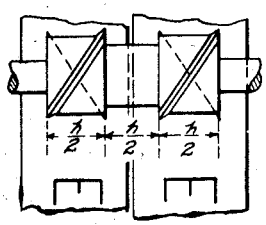
Fig. 3 is a view similar to Fig. 2 but showing a half turn of two threads on each printing wheel.
Figure 4:
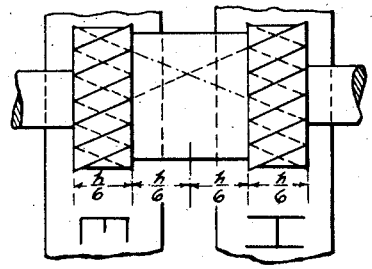
Figs. 4 and 5 are similar views but showing different spacing of wheels and numbers of threads.
Figure 5:
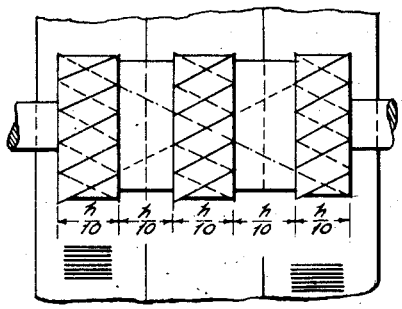

Figs. 2 to 6 show further instances of the invention for spindles made of one piece and whose threads are at first ground throughout the entire length and then again ground out in rings. In Figs. 2, 3 and 5 the distance between two spindle points which scan simultaneously is equal to two times and in Fig. 4 equal to three times the length of a scanning line for a character.

Figure 6:
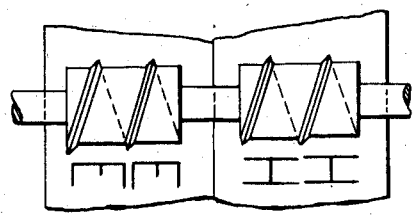
Fig. 6 is a view similar to Fig. 1 but showing a different spacing of wheels and each wheel having two complete turns of thread.

While in Figs. 1, 2 and 6 the spindles are single threaded and scan simultaneously lines of the pitch $h$ during one complete rotation, the other figures show multiple threaded spindles, i. e., Fig. 3 a double-threaded spindle which scans a line during half a rotation. Three half turns are produced on the spindle, of which the central half turn is ground out.

In Fig. 4 is shown a sextuple threaded spindle. The length of the spindle amounts to $4/6$ of the pitch. In the center $2/6$ of the pitch is ground out.

In Fig. 5 the spindle length amounts to 5/10 of the pitch, of which 2/10 is ground out. Ten lines are successively scanned during each rotation (spindle with ten threads).

In order to render legible a character on each tape in the case of fluctuations in synchronism, a double recording may be employed as shown in Fig. 6. Thus if one line of characters runs off the tape the second line will be brought onto the tape and the message will be always readable.

What is claimed is:

1. A scanning device for use in a facsimile receiver comprising a rotatable member adapted simultaneously to record duplicate characters on a sheet, said member being formed in one piece and having two longitudinally spaced cylindrical surfaces each formed with an outstanding thread portion, a thread portion on one surface being a continuation of a thread portion on another surface, the spacing between said surfaces being such that corresponding points along each thread portion lie and are peripherally located on one straight line parallel to the cylinder axis.

2. The scanning device according to claim 1, wherein each surface has two thread portions, the portions being spaced peripherally so that each end of one thread portion is at the same peripheral point as and at the opposite ends of the surface from an end of the other thread.

RUDOLF HELL.